United States Patent
Lussier (10) Patent No.: US 11,058,180 B2
(45) Date of Patent: Jul. 13, 2021

(54) UV CURABLE LATTICE MICROSTRUCTURE FOR FOOTWEAR

(71) Applicant: adidas AG, Herzogenaurach (DE)

(72) Inventor: Michel Reginald Lussier, Portland, OR (US)

(73) Assignee: adidas AG, Herzogenaurach (DE)

( * ) Notice: Subject to any disclaimer, the term of this patent is extended or adjusted under 35 U.S.C. 154(b) by 271 days.

(21) Appl. No.: 16/023,881

(22) Filed: Jun. 29, 2018

(65) Prior Publication Data

US 2018/0310667 A1 Nov. 1, 2018

Related U.S. Application Data (62) Division of application No. 15/184,470, filed on Jun. 16, 2016, now Pat. No. 10,034,519.

(51) Int. Cl.
*A43B 23/02* (2006.01)
*A43B 7/08* (2006.01)
(Continued)

(52) U.S. Cl.
CPC .......... *A43B 23/0245* (2013.01); *A43B 7/085* (2013.01); *A43B 23/0205* (2013.01); *A43B 23/026* (2013.01); *A43B 23/042* (2013.01); *A43C 5/00* (2013.01); *B29C 35/0805* (2013.01); *B29C 35/0894* (2013.01); *B29C 64/124* (2017.08); *B29C 64/129* (2017.08); *B29D 35/12* (2013.01); *B29D 35/126* (2013.01); *B33Y 10/00* (2014.12); *B33Y 80/00* (2014.12); *A43B 5/00* (2013.01); *A43B 23/028* (2013.01);
(Continued)

(58) Field of Classification Search
CPC ... B29C 64/129; B29C 35/0894; B29C 35/12; A43B 23/0265
See application file for complete search history.

(56) References Cited

U.S. PATENT DOCUMENTS 2,131,756 A 10/1938 Roberts
2,294,424 A 9/1942 Roberts
(Continued)

FOREIGN PATENT DOCUMENTS

CN 1067566 1/1993
CN 102711538 10/2012
(Continued)

OTHER PUBLICATIONS

Adidas Futurecraft 3D (Youtube video), posted at https://www.youtube.com/watchv=3RucyZiPfjw (website screenshot submitted), Oct. 7, 2015, 2 pages.
(Continued)

*Primary Examiner* — Jacob T Minskey
*Assistant Examiner* — Virak Nguon
(74) *Attorney, Agent, or Firm* — Kilpatrick Townsend & Stockton LLP (57) ABSTRACT

An upper for a sports shoe may include a component such as a vamp or a rear portion. The shoe component may include a UV curable microlattice structure with a plurality of regions such that each region has a different density. In some cases, the microlattice structure may include a high density microlattice structure, a mid-level density microlattice structure, and a non-structural region with a low density microlattice structure.

20 Claims, 12 Drawing Sheets

(51) Int. Cl.
  *A43B 23/04* (2006.01)
  *B29C 35/08* (2006.01)
  *B29D 35/12* (2010.01)
  *A43C 5/00* (2006.01)
  *B33Y 10/00* (2015.01)
  *B33Y 80/00* (2015.01)
  *B29C 64/124* (2017.01)
  *B29C 64/129* (2017.01)
  *A43B 5/00* (2006.01)
  *B29K 105/00* (2006.01)

(52) U.S. Cl.
  CPC ............... *B29C 2035/0827* (2013.01); *B29K 2105/0002* (2013.01)

(56) References Cited

U.S. PATENT DOCUMENTS

| | | | |
|---|---|---|---|
| 2,684,305 | A | 7/1954 | Leroy |
| 4,611,412 | A | 9/1986 | Cohen |
| 5,632,057 | A | 5/1997 | Lyden |
| 5,758,435 | A | 6/1998 | Miyata |
| 6,655,048 | B2 | 12/2003 | Moretti et al. |
| 6,763,611 | B1 | 7/2004 | Fusco et al. |
| 6,939,502 | B2 | 9/2005 | Lyden et al. |
| 7,003,803 | B1 | 2/2006 | Lyden et al. |
| 7,774,884 | B2 | 8/2010 | Greene et al. |
| 7,836,608 | B2 | 11/2010 | Greene et al. |
| 8,065,818 | B2 | 11/2011 | Hoke et al. |
| 8,578,535 | B2 | 11/2013 | Dojan et al. |
| 8,726,540 | B2 | 5/2014 | Crowley, II et al. |
| 8,826,566 | B2 | 9/2014 | Crowley, II et al. |
| 9,017,806 | B2 | 4/2015 | Manning et al. |
| 9,405,067 | B2 * | 8/2016 | Yang ................. B32B 3/00 |
| 9,527,261 | B1 * | 12/2016 | Roper ................. F28D 15/046 |
| 2006/0048413 | A1 | 3/2006 | Sokolowski et al. |
| 2007/0180730 | A1 | 8/2007 | Greene et al. |
| 2009/0126225 | A1 | 5/2009 | Jarvis |
| 2012/0021151 | A1 | 1/2012 | Tatarka et al. |
| 2012/0117825 | A9 | 5/2012 | Jarvis et al. |
| 2012/0144698 | A1 * | 6/2012 | McDowell ............ B29C 51/002 36/45 |
| 2012/0167418 | A1 | 7/2012 | Frappier et al. |
| 2012/0180341 | A1 | 7/2012 | Crowley et al. |
| 2013/0273347 | A1 | 10/2013 | Jacobsen et al. |
| 2014/0020191 | A1 | 1/2014 | Jones et al. |
| 2014/0026773 | A1 | 1/2014 | Miller et al. |
| 2014/0029030 | A1 | 1/2014 | Miller et al. |
| 2014/0130270 | A1 | 5/2014 | Baudouin et al. |
| 2014/0134378 | A1 * | 5/2014 | Downs ............ B29C 37/0078 428/57 |
| 2014/0299009 | A1 | 10/2014 | Miller et al. |
| 2014/0300675 | A1 | 10/2014 | Miller et al. |
| 2014/0300676 | A1 | 10/2014 | Miller et al. |
| 2015/0013187 | A1 | 1/2015 | Taniguchi et al. |
| 2015/0111979 | A1 * | 4/2015 | Yang .................. C08F 36/02 522/15 |
| 2015/0298443 | A1 | 10/2015 | Hundley et al. |
| 2015/0328512 | A1 * | 11/2015 | Davis .................. A63B 60/54 473/563 |
| 2016/0007687 | A1 * | 1/2016 | Surace ................. A43B 7/087 36/89 |
| 2016/0021969 | A1 | 1/2016 | Lettow, II et al. |
| 2016/0242505 | A1 | 8/2016 | Waatti et al. |
| 2016/0346626 | A1 | 12/2016 | Hanson et al. |
| 2016/0362552 | A1 | 12/2016 | Reichel et al. |
| 2016/0374428 | A1 | 12/2016 | Kormann et al. |
| 2017/0181496 | A1 * | 6/2017 | Guyan ................. A43B 13/02 |
| 2017/0202309 | A1 | 7/2017 | Sterman et al. |

FOREIGN PATENT DOCUMENTS

| | | |
|---|---|---|
| CN | 105636993 | 6/2016 |
| CN | 106418874 | 2/2017 |
| DE | 19753863 | 6/1998 |
| DE | 102004045176 | 3/2006 |
| DE | 102015209811 | 12/2016 |
| DE | 102015212099 | 12/2016 |
| EP | 185781 | 6/1988 |
| EP | 1378898 | 1/2004 |
| EP | 1434211 | 6/2004 |
| EP | 1484148 | 12/2004 |
| EP | 1872924 | 1/2008 |
| EP | 2424398 | 3/2012 |
| EP | 2441338 | 4/2012 |
| EP | 2564719 | 3/2013 |
| EP | 2671703 | 12/2013 |
| EP | 2744744 | 6/2014 |
| EP | 2777420 | 9/2014 |
| EP | 2838708 | 2/2015 |
| EP | 3053732 | 8/2016 |
| GB | 2494131 | 1/2014 |
| JP | H03045902 | 2/1991 |
| WO | 2004021817 | 3/2004 |
| WO | 2006031003 | 3/2006 |
| WO | 2010126707 | 11/2010 |
| WO | 2010126708 | 11/2010 |
| WO | 2012170008 | 12/2012 |
| WO | 2014015033 | 1/2013 |
| WO | 2014008331 | 1/2014 |
| WO | 2014015037 | 1/2014 |
| WO | 2014036124 | 3/2014 |
| WO | 2014100462 | 6/2014 |
| WO | 2014209308 | 12/2014 |
| WO | 2016089462 | 6/2016 |
| WO | 2017007533 | 1/2017 |

OTHER PUBLICATIONS

U.S. Appl. No. 15/184,470, "Non Final Office Action", dated Nov. 22, 2017, 9 pages.
U.S. Appl. No. 15/184,470, "Notice of Allowance", dated Apr. 3, 2018, 5 pages.
Chinese Patent Application No. 201710455737.6, "Office Action", dated Aug. 28, 2019, 20 pages (machine English translation provided).
European Patent Application No. 17175040.9, "Extended European Search Report", dated Oct. 20, 2017, 5 pages.
European Patent Application No. 18209551.3, "Extended European Search Report", dated Mar. 13, 2019, 7 pages.

* cited by examiner

UV CURABLE LATTICE MICROSTRUCTURE FOR FOOTWEAR

CROSS REFERENCE TO RELATED APPLICATION

This application is a divisional of U.S. patent application Ser. No. 15/184,470, filed on Jun. 16, 2016, entitled UV CURABLE LATTICE MICROSTRUCTURE FOR FOOTWEAR, which is hereby incorporated herein in its entirety by this reference.

FIELD OF THE INVENTION

The present invention relates to a lattice microstructure made of an ultra-violet ("UV") curable monomer that is formed into various footwear components, padding, and other protective equipment. The lattice structure has different structural properties in targeted regions of the structure.

BACKGROUND

Lattice microstructures are arrays of beams and trusses arranged three-dimensionally ("3D") in crisscrossed and/or diagonal patterns. Various geometries can be used depending on the application of the lattice. For uses requiring strength and support, a close-knit structure is preferred. For uses requiring some flexibility, patterns with trusses spaced apart are preferred.

There are notable methods of creating 3D microstructures. One such method is stereolithography, which is a bottom-up, layer-by-layer approach.

Another method utilizes one or a few optical waveguides, in which an initial area of polymerization in a photosensitive monomer will trap a light and guide it to a tip of the polymerized region due to an index of refraction change.

The concept of using 3D printing technology in footwear has been investigated in certain specific applications. For example, 3D printed material formed having a lattice structure has been used as a midsole. In some applications, to attain the necessary flexibility, the lattice structure is formed with various gaps and breakage in the structure, which results in a non-uniform lattice structure.

Other attempts to use 3D printing in midsoles are described in U.S. Pat. No. 6,763,611. In this application, the midsole has a lattice structure with a plurality of connectors and masses to attenuate and distribute ground reaction forces as a person walks, but the structure is not a microstructure and there is no description of forming the structure from a UV curable monomer with varying strength and flexibility properties. There is also no suggestion to incorporate the lattice structure into other parts of the footwear, such as the upper, tongue, vamp, eyelets, and eye stays.

U.S. Pat. No. 8,726,540 describes footwear with a sole having a grid pattern, in which channels are disposed in the pattern to promote flow of loose water off the sole, but there is no description of forming the structure from a UV curable monomer with varying strength, flexibility, and permeability in targeted regions of the structure.

European Patent App. No. 2,777,420 describes a shoe with a lattice midsole having a plurality of zones, each zone differing from one another in height to promote improved foot movement. The lattice midsole is made of a nylon polymer, but there is no description of forming the structure from a UV curable monomer and no description or suggestion of additional properties of their lattice midsole, other than providing varied height in the structures.

U.S. Pat. No. 5,632,057 describes a method of making orthotic devices for footwear using UV curing technology, in which light of a particular wavelength from a light source passes through a light table to cure a conformable device around a person's foot, but there is no description of a microlattice structure with different utilizations for footwear, padding, and insulation.

U.S. Pat. No. 9,017,806 describes a lattice microstructure with microstruts extending in different directions and sandwiched between two platforms to form a shoe insole, but there is no description or suggestion to incorporate the lattice microstructure into other shoe components. There are also no specifics given regarding how to use lattice microstructures for padding or insulation, such as a particular shape or structure.

Thus, is may be desirable to utilize lattice microstructures formed from a UV curable monomer with varying strength, flexibility, and permeability in targeted regions of the structure to produce other shoe components, such as the upper, tongue, vamp, quarters, and/or closure systems (i.e., laces), in a quick and efficient manner and with tunable properties ranging from strong, durable, flexible, and breathable.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an upper for a sports shoe comprises: a vamp comprising a UV curable microlattice structure comprising a plurality of regions such that each region comprises a different density.

In some embodiments, the plurality of regions comprises at least two of an eye stay region, a structural panel, and a non-structural region.

In certain embodiments, the plurality of regions comprises an eye stay region, a structural panel, and a non-structural region.

The eye stay region, in some embodiments, comprises a high density microlattice structure, the structural panel comprises a mid-level density microlattice structure, and the non-structural region comprises a low density microlattice structure.

In certain embodiments, the structural panel is disposed between the eye stay region and the bottom of the vamp, and the non-structural region is disposed adjacent to the structural panel.

The vamp, in certain embodiments, comprises a transition between the UV curable microlattice structure and a second material. In some embodiments, the second material is selected from the group consisting of knits, woven fabric, non-woven fabric, leather, and synthetic leather.

In some embodiments, the plurality of regions of the vamp each comprise a different color or pattern created by additives impregnated into each region.

According to certain embodiments of the present invention, an upper for a sports shoe comprises: a rear portion comprising a UV curable microlattice structure comprising a plurality of regions such that each region comprises a different density.

In certain embodiments, the plurality of regions comprises at least two of a collar, a heel counter, and a padding region. In some embodiments, the plurality of regions comprises a collar, a heel counter, and a padding region. In certain embodiments, the heel counter comprises a high density microlattice structure, the collar comprises a mid-level density microlattice structure, and the padding region comprises a low density microlattice structure.

The rear portion, in some embodiments, comprises a transition between the UV curable microlattice structure and a second material. In certain embodiments, the second material is selected from the group consisting of knits, woven fabric, non-woven fabric, leather, and synthetic leather.

In some embodiments, the plurality of regions of the rear portion each comprise a different color or pattern created by additives impregnated into each region.

According to certain embodiments of the present invention, a method of forming an upper of a microlattice structure for a shoe comprises: pouring resin into a chamber; passing ultraviolet light through a mask into the resin along light paths defined by the mask to create an upper with portions of at least two different densities; disassembling the upper in a green state from the chamber; and post curing the upper into a final shape outside of the chamber.

The method of forming an upper of a microlattice structure for a shoe, in certain embodiments, further comprises mapping and designing various components of the upper and designing the mask based on the upper.

In some embodiments, the post curing comprises using a mold to define a permanent shape for the upper.

The method of forming an upper of a microlattice structure for a shoe, in some embodiments, further comprises forming a transition between the microlattice structure and a second material. In certain embodiments, the second material is selected from the group consisting of knits, woven fabric, non-woven fabric, leather, and synthetic leather.

The method of forming an upper of a microlattice structure for a shoe, in some embodiments, further comprises impregnating additives into a plurality of regions of the upper to create different colors or patterns.

BRIEF DESCRIPTION OF THE DRAWINGS

In the following detailed description, embodiments of the invention are described referring to the following Figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Footwear Components Comprising a Microlattice Structure

According to certain embodiments of the present invention, footwear components 10, such as uppers, tongues, vamps, quarters, toe boxes, front portion, rear portion, and/or eye stays, are formed of a microlattice structure 12. In certain embodiments, as shown in FIGS. 1A-9B, the microlattice structure 12 may be used to alter and/or enhance certain properties of the footwear component. These properties may include but are not limited to strength, breathability, rigidity, flexibility, articulation, and durability.

In these embodiments, the microlattice structure 12 is an array of beams and trusses arranged three-dimensionally. The relative density ($\rho_r$) of a microlattice structure is defined as the density of the lattice ($\rho$) divided by the density of the constituent solid ($\rho_s$), ranging from 0.2 to 0.02%. Relative density is a geometric parameter that defines the amount of empty space in a lattice.

The relative density of the microlattice structure 12 may be increased by increasing the number of beams and trusses within a 3D space, thereby creating a more close-knit structure. Microlattice structures 12 with higher relative densities provide a stiffer structure with greater resilience and stability. The relative density may be controlled using a combination of one or more of the chemistry of the monomer, the geometry of the lattice, additives/coatings on the lattice, and/or any other appropriate variable.

Figure 3A:
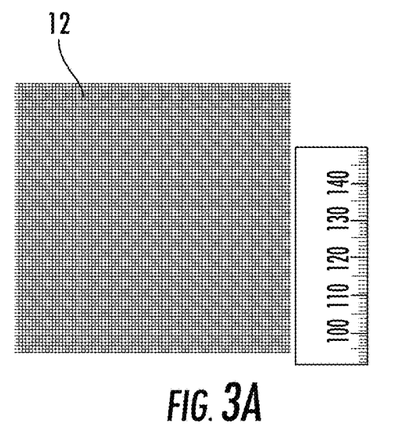
FIGS. 3A, 3B, 3C, 3D, 3E, and 3F show various densities and shapes of the microlattice structure of FIG. 2.
Figure 3B:
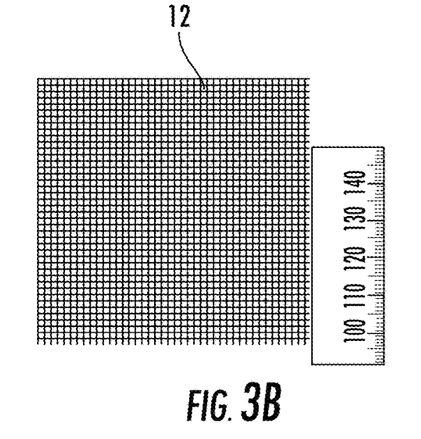
Figure 3C:
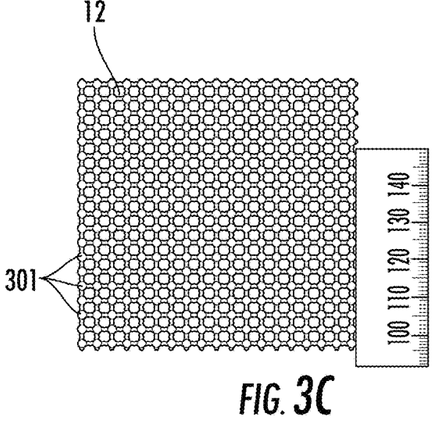
Figure 3D:
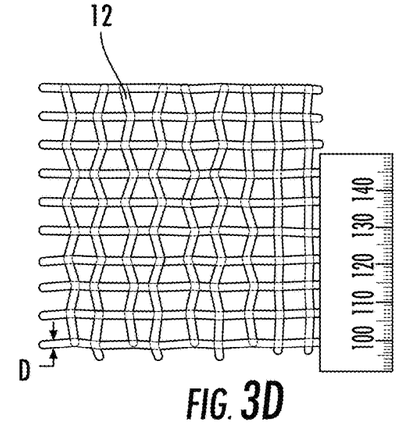
Figure 3E:
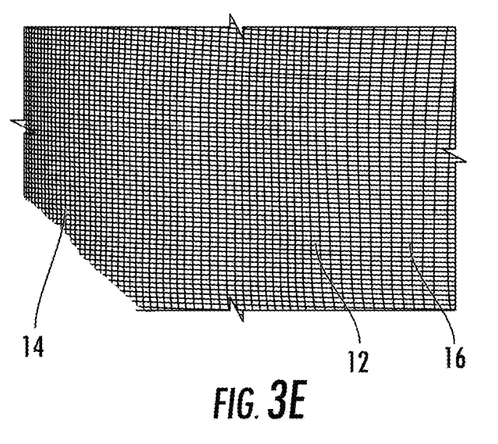

As shown in FIGS. 3A-3D, the microlattice structure 12 may be configured with various uniform densities. FIGS. 3A-3C show examples where the beams are primarily orthogonal. In FIG. 3C, there are nodes 301 present at the intersection of beams that are larger than the diameter D of the beams. In some embodiments, the nodes 301 are spherical. However, the nodes 301 may be any appropriate shape. In some examples, the nodes 301 enhance flexibility of the microlattice structure 12. FIG. 3D shows an example where at least some of the beams are non-orthogonal. As shown in FIG. 3E, in some embodiments, the microlattice structure 12 may be configured to transition between one or more regions of higher relative density 14 and one or more regions of lower relative density 16.

Conversely, relative density of the microlattice structure 12 may be decreased by decreasing the number of beams and trusses within a 3D space, thereby creating a more open-knit structure. Microlattice structures 12 with lower relative densities provide flexibility, permeability, and/or breathability. Changing the density of the microlattice structure 12 allow a shoe (such as a sports shoe) or a portion of a shoe to be particularly designed to optimize multiple properties including, but not limited to strength, breathability, permeability, resilience, stability, and flexibility. In some embodiments, relative density can be adjusted through changes to at least one of the chemical composition of the monomer, the geometry of lattice, and the additives/coatings on the lattice.

In some embodiments, relative densities are selected in relation to the required mechanical properties of the components. Components such as eye stays and portions of midfoot 24 may require higher density because they hold the wearer's foot under higher tensile loads. Generally, central areas have higher densities to provide protection against lace-bite, and edges to provide shape, contour, and tear resistance. Some portions of the vamp and tongue components may include lower density because these components are not subject to the same load conditions and do not provide as much support for the wearer's foot. These components may be arranged to provide exposure for permeability and ventilation.

In certain embodiments, parametric design and/or generative design may be utilized to design and/or customize the microlattice structure 12 based on specific loading conditions and/or specific geometry of an wearer's foot. In addition, parametric design and/or generative design may be utilized to design and/or customize a Biaxially-oriented polyethylene terephthalate (BoPET) mask that may be used to create the microlattice structure 12. The mask may be constructed from any appropriate material. In some embodiments, the mask may be Mylar®. Parametric design uses certain parameters or variables that can be edited to manipulate or alter the end result of a system. In some embodiments, when using FEA, forces applied on a person's foot are predicted, measured, and analyzed to design the mask used to help form the UV curable upper. Generative designing may use a set of algorithms to generate outputs, such as images, sounds, architectural models, and/or animations. This technique may also be used in creating the mask used for producing UV curable patterns.

In certain embodiments of the present invention, the footwear component 10 comprises a microlattice structure 12 comprising at least one region of higher relative density 14 and at least one region of lower relative density 16.

In certain embodiments where the footwear component 10 is an upper 18, the at least one region of higher relative density 14 may be arranged in regions requiring greater resilience and stability, including but not limited to eye stays 17, toe box 23, heel cup, and medial/lateral supports. In addition, the at least one region of lower relative density 16 may be arranged in regions requiring greater flexibility, permeability, and/or breathability, including but not limited to the vamp and tongue. The relative density may be selected in proportion to the desired level of support.

Figure 1A:
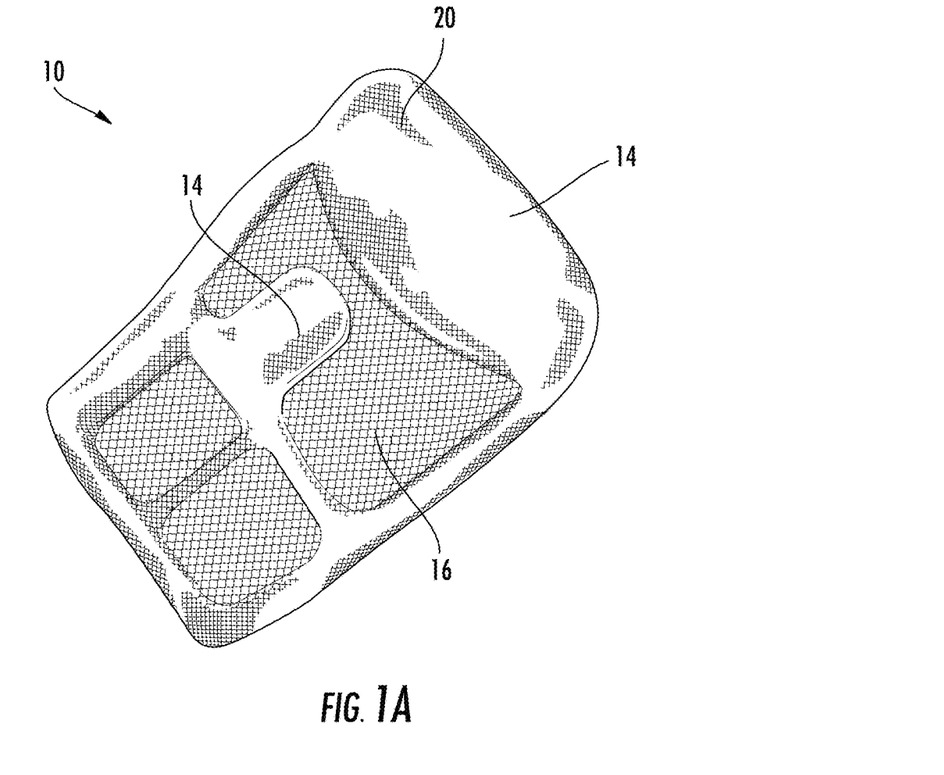
FIGS. 1A and 1B are perspective views of a shoe component according to certain embodiments of the present invention.
Figure 1B:
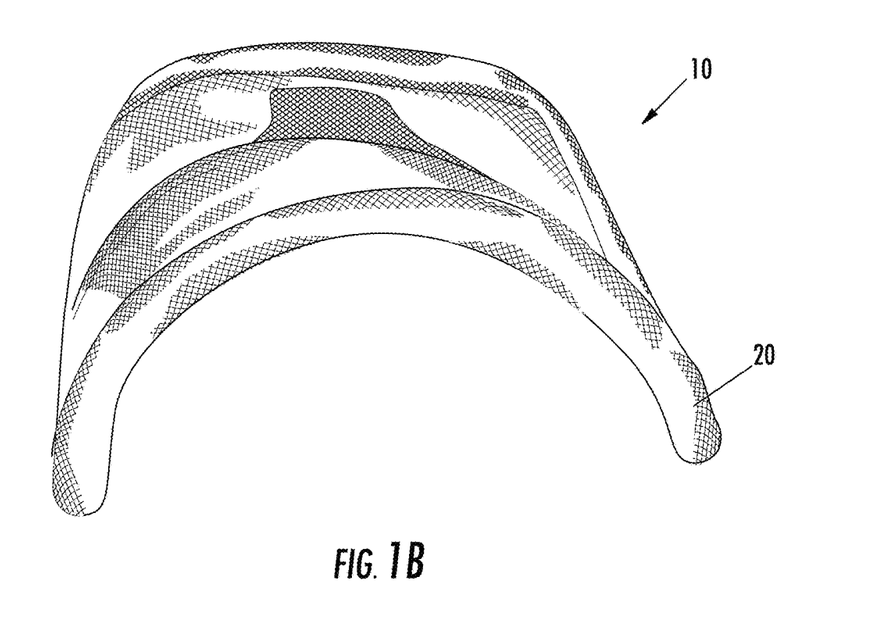

As shown in FIGS. 1A and 1B, in certain embodiments where the footwear component 10 is a tongue 20, the at least one region of higher relative density 14 may be arranged in central portions to provide protection against lace-bite. In addition, the at least one region of lower relative density 16 may be arranged in selected portion(s) to provide ventilation. The tongue 20 may also include a region of higher relative density 14 near the top of the tongue to withstand pulling and handling forces from a wearer.

Figure 5:
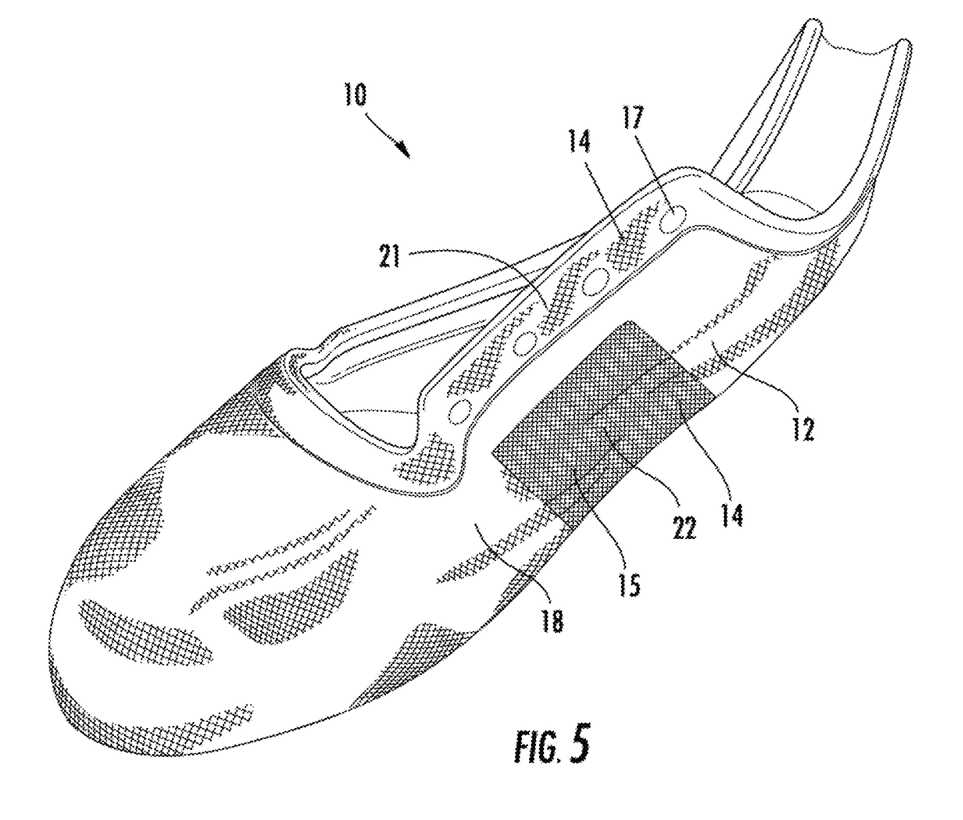
FIG. 5 is a perspective view of a shoe component according to certain embodiments of the present invention.
Figure 6A:
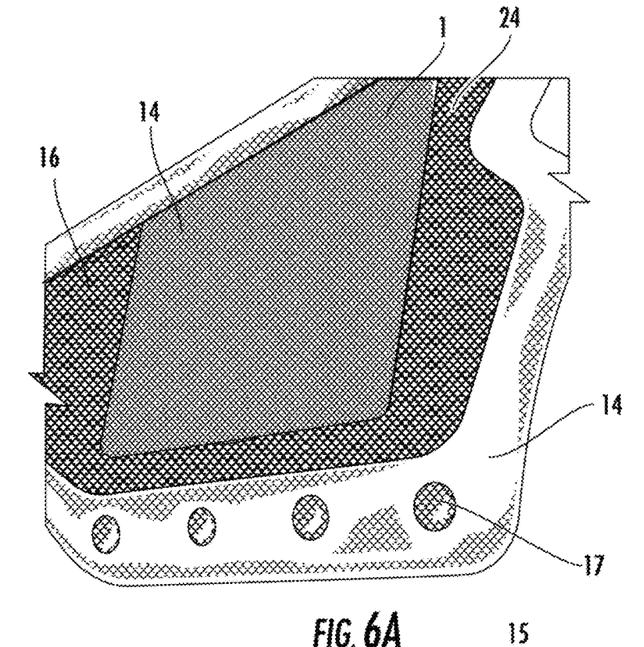
FIGS. 6A and 6B are detail views of a shoe component according to certain embodiments of the present invention.
Figure 6B:
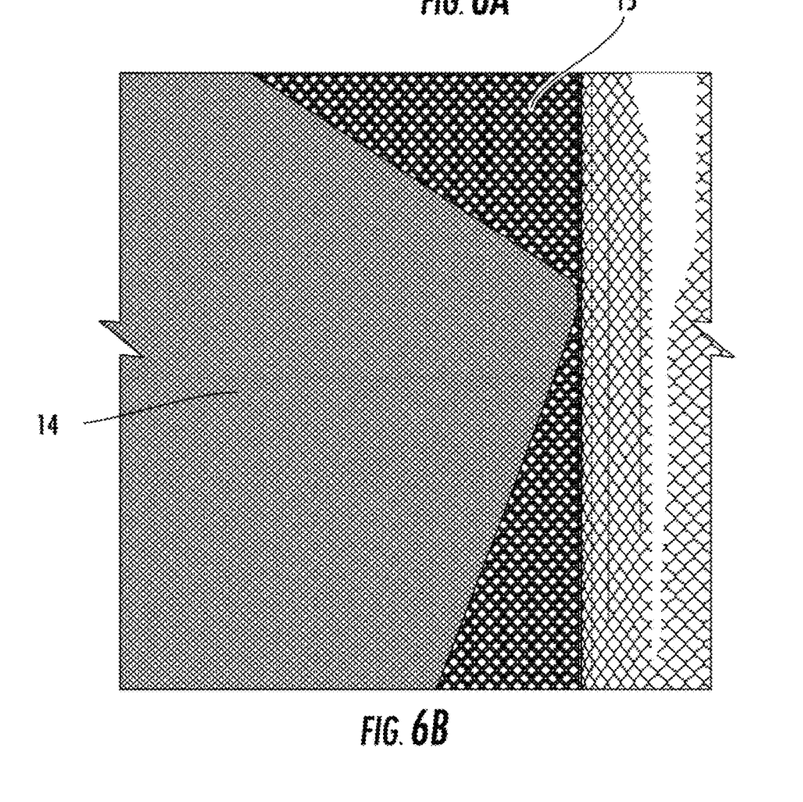

In certain embodiments where the footwear component is a vamp 22, as shown in FIG. 5, the at least one region of higher relative density 14 may be arranged in the areas adjacent to the lace holes and the at least one region of lower relative density 16 may be arranged in the lace holes 17 (see FIG. 6A). In some embodiments, the vamp 22 may include one or more structural panels 15 of higher relative density 14 extending between the bottom of the upper 18 toward the eye stay region 21. Although the structural panel 15 of the vamp 22 is shown as a single trapezoidal or rectilinear area that stops short of the eye stay region 21 in FIG. 5, other configurations are may be appropriate. For example, the structural panel 15 may include multiple distinct areas of higher density, may extend the full distance between the bottom of the upper 18 and the eye stay region 21, may include curved or irregular shapes, or may include any other appropriate configuration. Furthermore, the upper 18 may include more than two different densities for microlattice structures 12. For example, the upper 18 may include three or more various density levels throughout the upper 18. In one example, the eye stay region 21 has a high density, the structural panels 15 have a mid-level density, and one or more non-structural region (disposed adjacent to the structural panel(s) 15) of the vamp 22 have a low level density. As shown in FIGS. 6A and 6B, the vamps may include at least one area of higher relative density 14 configured to extend from the laces toward the sole to better distribute forces from the laces through the other portions of the shoe. For example, forces applied from the laces into the eye stay region 21 may need to be distributed toward the lower portion of the upper 18 and/or into the sole.

Figure 7A:
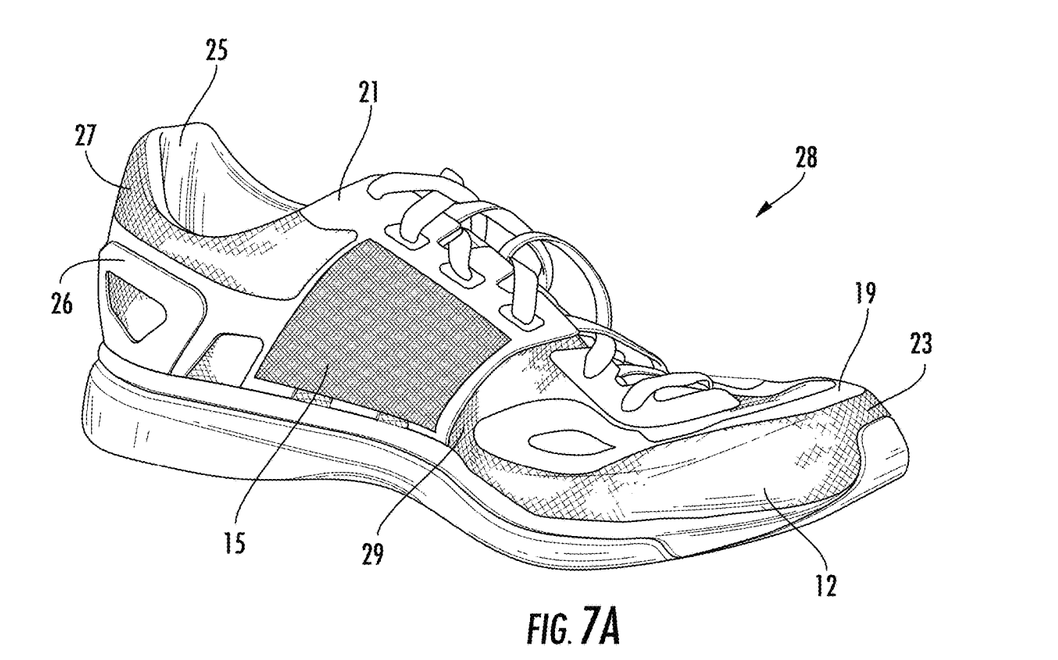
FIGS. 7A and 7B are perspective views of a shoe according to certain embodiments of the present invention.
Figure 7B:
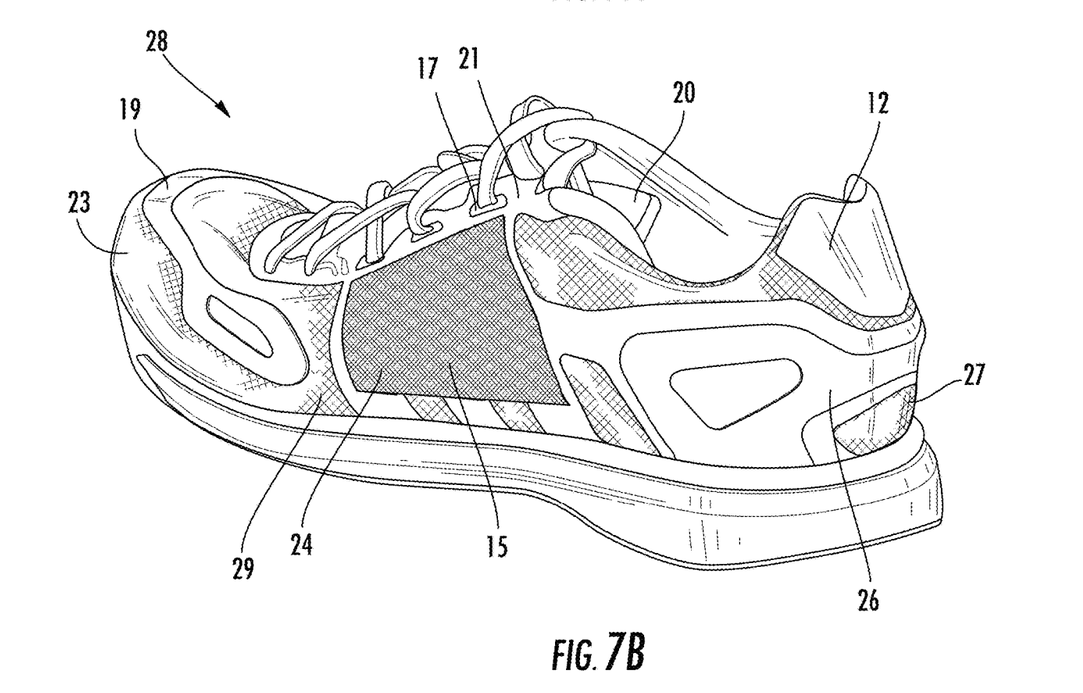
Figure 9A:
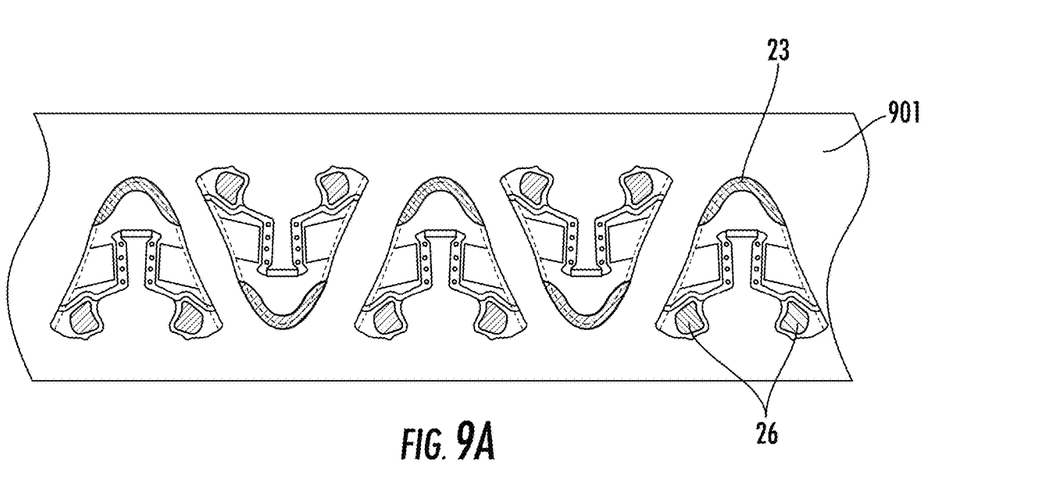
FIGS. 9A and 9B are top views of a shoe component according to certain embodiments of the present invention.
Figure 9B:
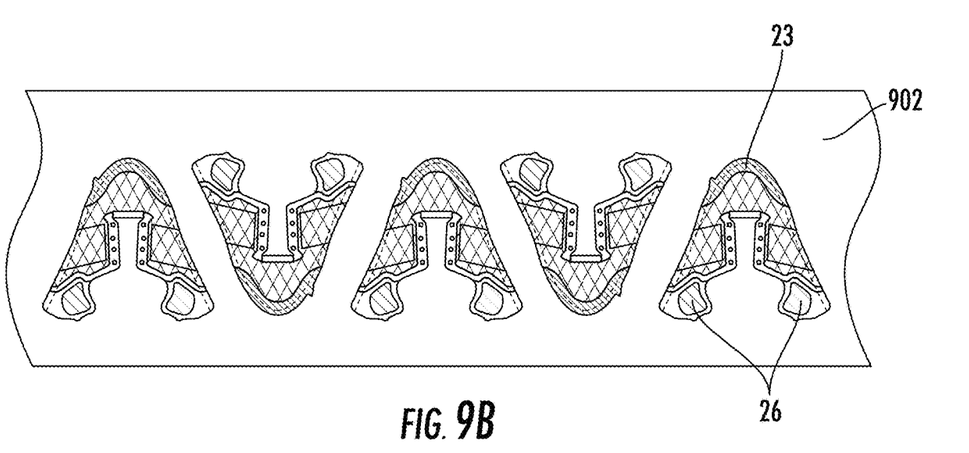

As shown in FIGS. 7A and 7B, a rear portion of the upper 18 may include a collar 27 and a heel counter 26. In some embodiments, the upper 18 includes a padding region 25 disposed on the interior (closer to the wearer). In certain embodiments, the heel counter 26 comprises microlattice structures 12 with a high density, the collar 27 comprises microlattice structures 12 with a mid-level density, and the padding region 25 comprises microlattice structures 12 with a low density. The heel counter 26 shown in FIGS. 7A and 7B is a single-piece component that wraps around the heel of the upper 18. However, as shown in FIGS. 9A and 9B, in certain embodiments, the heel counter 26 comprises multiple pieces on each side of the heel.

In some embodiments, a forward portion of an upper may include a toe box 23 and a toe structural member 19. In some embodiments, the toe box 23 and toe structural member 19 each comprise microlattice structures 12. In certain embodiments, the components in the forward portion of the upper comprise two or more different densities of microlattice structures 12. In some examples, the structural member 19 comprises microlattice structures 12 with a high density and the toe box 23 comprises microlattice structures 12 with a mid-level and/or low density. The structural member 19 ensures that the forces from a wearer's toes are appropriately distributed through the upper and/or into the sole.

Figure 10:
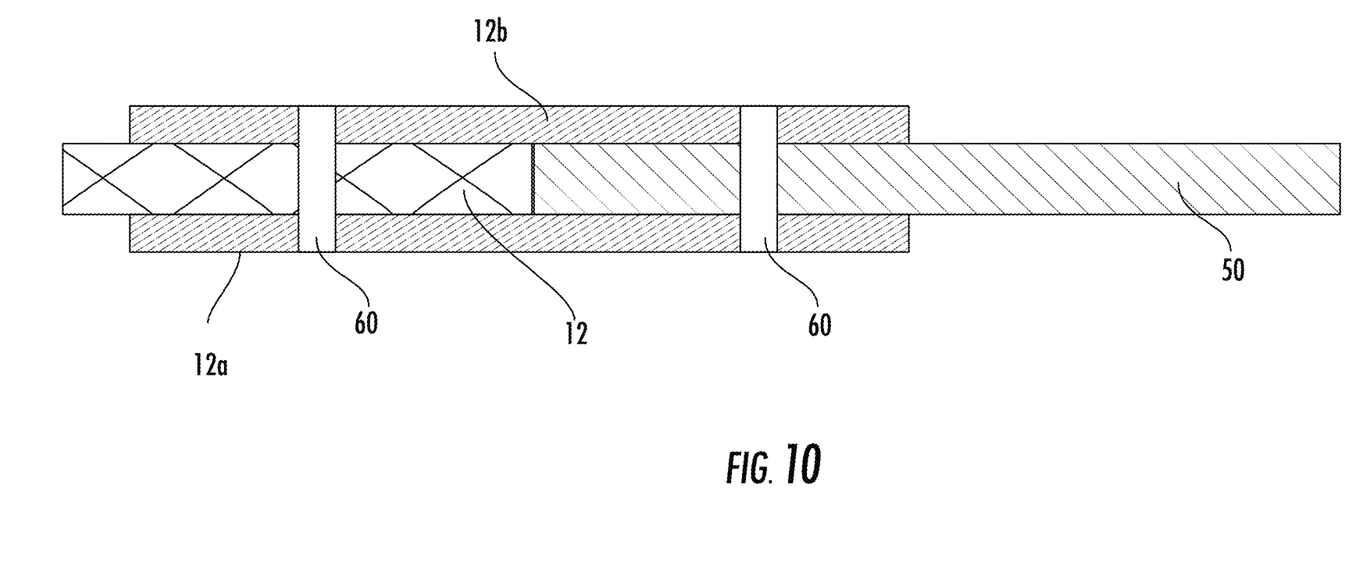
FIG. 10 is a detail view of a shoe component according to certain embodiments of the present invention.

The microlattice structures 12 may be combined with other materials 50 including but not limited to knits, woven fabric, non-woven fabric, leather, or synthetic leather to form the footwear component. For example, the microlattice structures 12 may be used in areas where high breathability and permeability are desired (such as in the tongue, vamp, and other areas where sweat and heat dispersion most occur), and the other materials 50 may be used in areas where greater rigidity and support are needed (such as in the toe area, heel area, medial/lateral side supports). As shown in FIG. 10, the bottom and top layers 12*a* and 12*b* may include bonding flanges (bonding films) such that the bottom and top layers surround both microlattice 12 and a second material 50. In some embodiments, the bottom and top layers 12*a* and 12*b* are configured to overlap a transition between the microlattice 12 and the second material 50. The second material 50 may be, for example, fabric (woven or nonwoven), leather, or any other appropriate material. To secure the transition area between the microlattice 12 and the second material 50, the component may include at least one stitch 60. The stitches 60 are optional.

The microlattice structures 12 may further include a range of colorations to impart different colorations and patterns on the footwear components 10. The process of adding color to the microlattice structures 12 is similar to that of coloring light emitting diodes ("LEDs"). For example, AURA® Infusion was developed by Bayer® MaterialScience and is licensed exclusively to Omnifusion. In this step, organic additives are impregnated into the polymer, then rinsed and dried. This step takes about 30-60 seconds to complete. Masks 850 of various designs and patterns may be applied on uppers to create different colorations. Furthermore, components of the upper can be colored independently. Alternatively, and/or in addition, other methods of coloration may be utilized to impart various colors and patterns on portions of footwear components 10. Examples include, but are not limited to, painting, coating, conventional dying, anodization, and metallization.

In some embodiments, the microlattice structures 12 may be used to replace footwear upper components 10 made from traditional and/or 3D printing/rapid-prototyping. The types of footwear components 10 that may be replaced include but are not limited to tongue and tongue padding, toe box 23, vamp, lace bite protection, heel counters 26 and heel padding, a collar 27 for comfort, other padding or protection areas, midsoles, sprint plates, and sockliners for letting air flow under the foot. Likewise, the microlattice structure 12 may be used in place of conventional materials used for insulation and golf coverings. In these embodiments, depending on the replacement application, the microlattice structures 12 may comprise at least one region of higher relative density 14 and at least one region of lower relative density 16, as described above. In certain applications, the microlattice structures 12 may comprise a uniform relative density, particularly in applications where the microlattice structures 12 are being used as cushioning components.

Figure 3F:
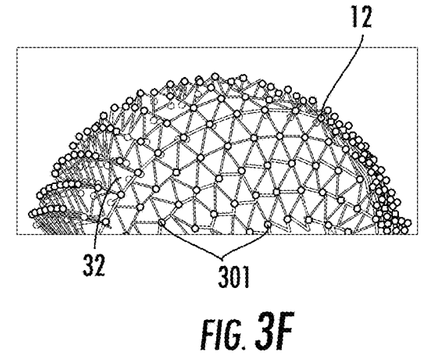
Figure 4A:
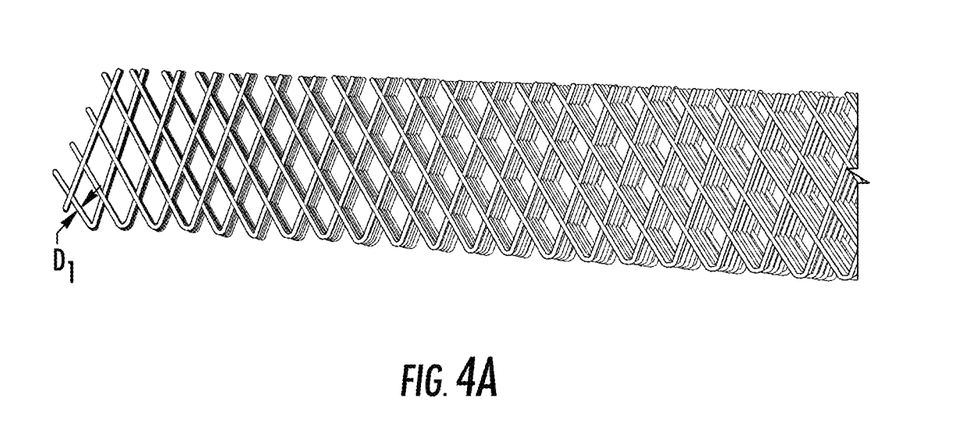
FIG. 4A is a side view of the microlattice structure of FIG. 2.
Figure 4B:
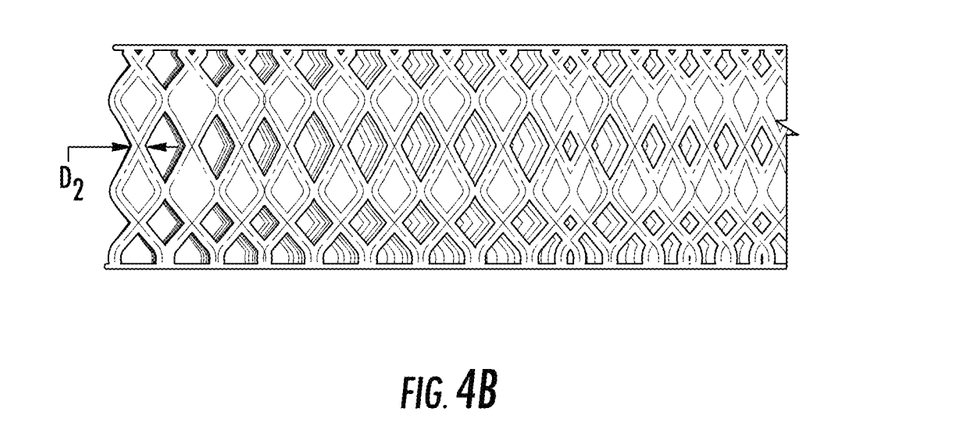
FIG. 4B is side view of a sandwich assembly incorporating the microlattice structure of FIG. 2.
Figure 11A:
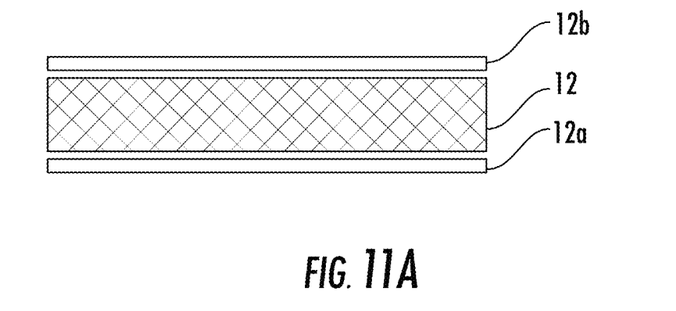
FIGS. 11A, 11B, and 11C are side views of a shoe component according to certain embodiments of the present invention.
Figure 11B:
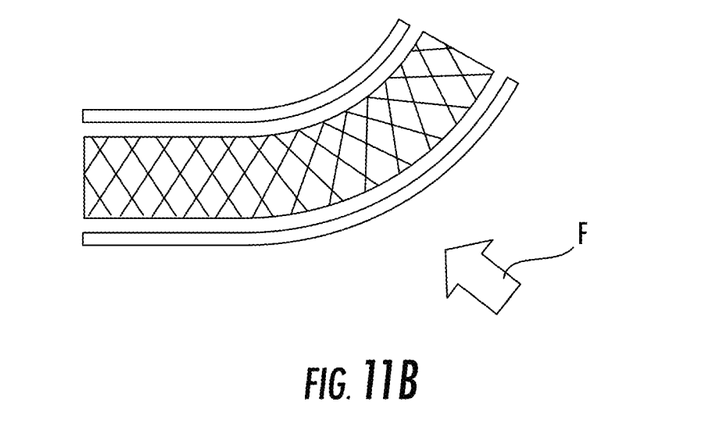
Figure 11C:
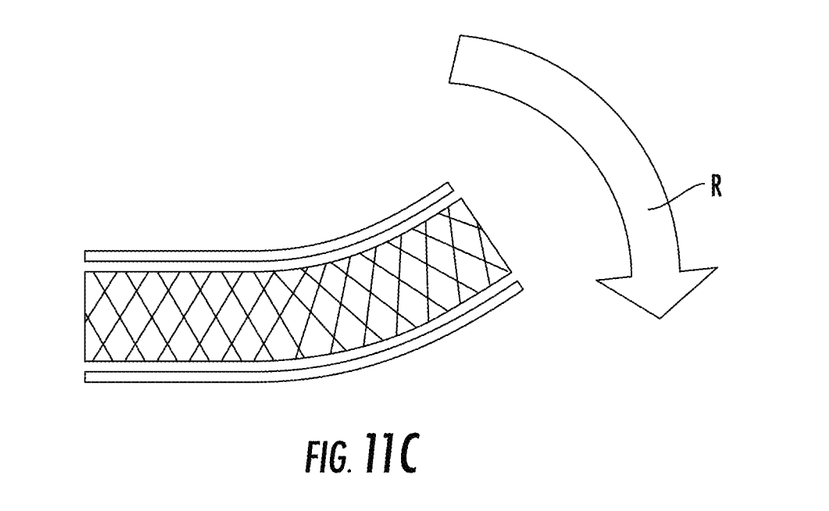

Microlattice structures may be formed or molded over shapes when in their "green state" (right after they are taken out of the bath). The microlattice structures may later be post-cured (using a UV source) such that the microlattice structures will keep the molded shape permanently. The microlattice structures may be sufficiently flexible to temporarily adjust to a different shape but can be used for a "spring back" effect to return to the molded shape. When a molded shape is elastically deformed, it will creep back to its original molded shape. Based on the geometric and other properties of the microlattice structures, the "creep back" effect occurs slowly like a mechanical system in an over-damped condition. The "spring back" effect or "creep back" effect could be used to articulate (or animate) sections of a footwear upper. As shown in FIG. 11A, a component including a microlattice structure 12, a lining (or bottom layer) 12*a*, and a top material (or top layer) 12*b* where the component may be molded into a first configuration. FIG. 11A shows the first configuration as a flat plate, although the first configuration may be any appropriate shape. For example, FIG. 3F shows a microlattice structure in a spherical shape. The microlattice structures may be formed into any appropriate shape. In FIG. 11B, an external force F is applied to deform the component to a second configuration. As one example, the second configuration shown in FIG. 11B includes lifting a first end of the flat plate upward and bending the flat plate. FIG. 11C shows the component after the external force F is no longer applied and the component moves back toward the first configuration via motion path R. The magnitude of the required external force F is related to the chemistry and the geometry of the microlattice structure. In some embodiments, the time required to move from the second configuration back to the first configuration is approximately 2-10 seconds. As one example for an upper, eye stays made using such molded lattices would spring back to their closed position after being spread apart to insert the foot into the shoe.

Method of Forming Footwear Components Comprising a Microlattice Structure

According to certain embodiments of the present invention, a method of manufacturing footwear components comprises using UV light and UV curable monomers to create microlattice structures with at least one region of higher relative density and at least one region of lower relative density. One way to adjust the density of the microlattice structure 12 is to change the spacing/distribution of the apertures in the mask. Examples of UV curable monomers include but are not limited to acrylates, urethanes, co-monomers.

Figure 8:
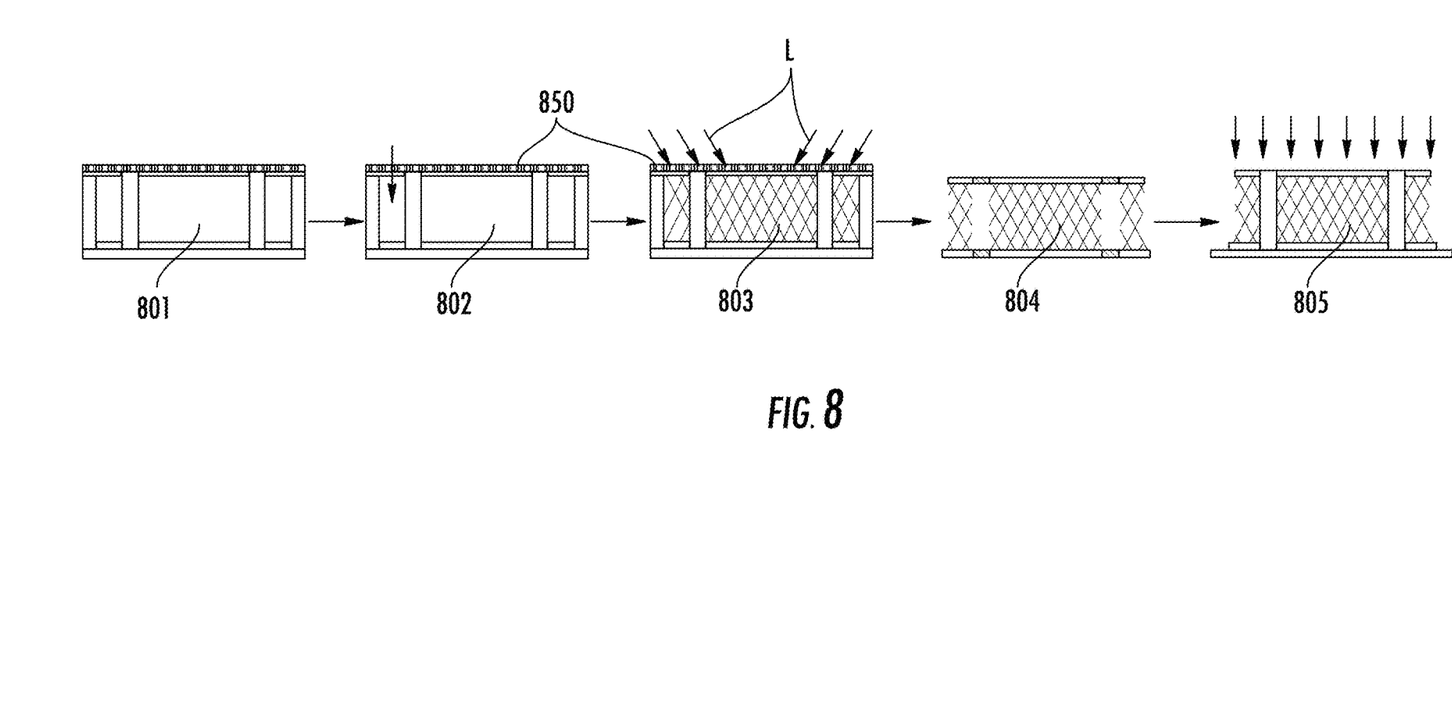
FIG. 8 is a schematic view of a process for making a microlattice structure according to certain embodiments of the present invention.

As shown in FIG. 8, a chamber may be created (see 801). After the chamber is prepared, as shown in 802, resin may be poured into the chamber. In 803, light L is sent through the mask 850 into the resin along light paths defined by the mask 850. The resin reacts with the UV light to cure the resin along the light paths. The component reaches the green state in 804 (partially, but not fully cured) and can disassembled from the chamber. In 805, additional or post curing occurs to complete the component. In some embodiments, the component (while in the green state) is place into or on a mold to define a permanent shape.

In some embodiments, to adjust relative density, specific areas of a shoe and/or an upper are designed to provide more or less support, breathability, and/or transparency (among other qualities). After mapping and designing the various portions of the shoe, a pattern is designed to correspond to the arrangement and the specific properties of the intended lattices. After the shape and structure of the pattern has been established, data (including for example, expected forces applied to the shoe) is analyzed for creating the special mask such that the analysis determines the lattices and their density.

As described above, altering the relative density of the microlattice structure 12 in certain locations within the footwear component 10 optimizes the performance of a shoe 28. For example, increasing the relative density of the microlattice structure 12 within the region 14 increases the rigidity and durability of the microlattice structure 10 in that region 14.

Figure 2:
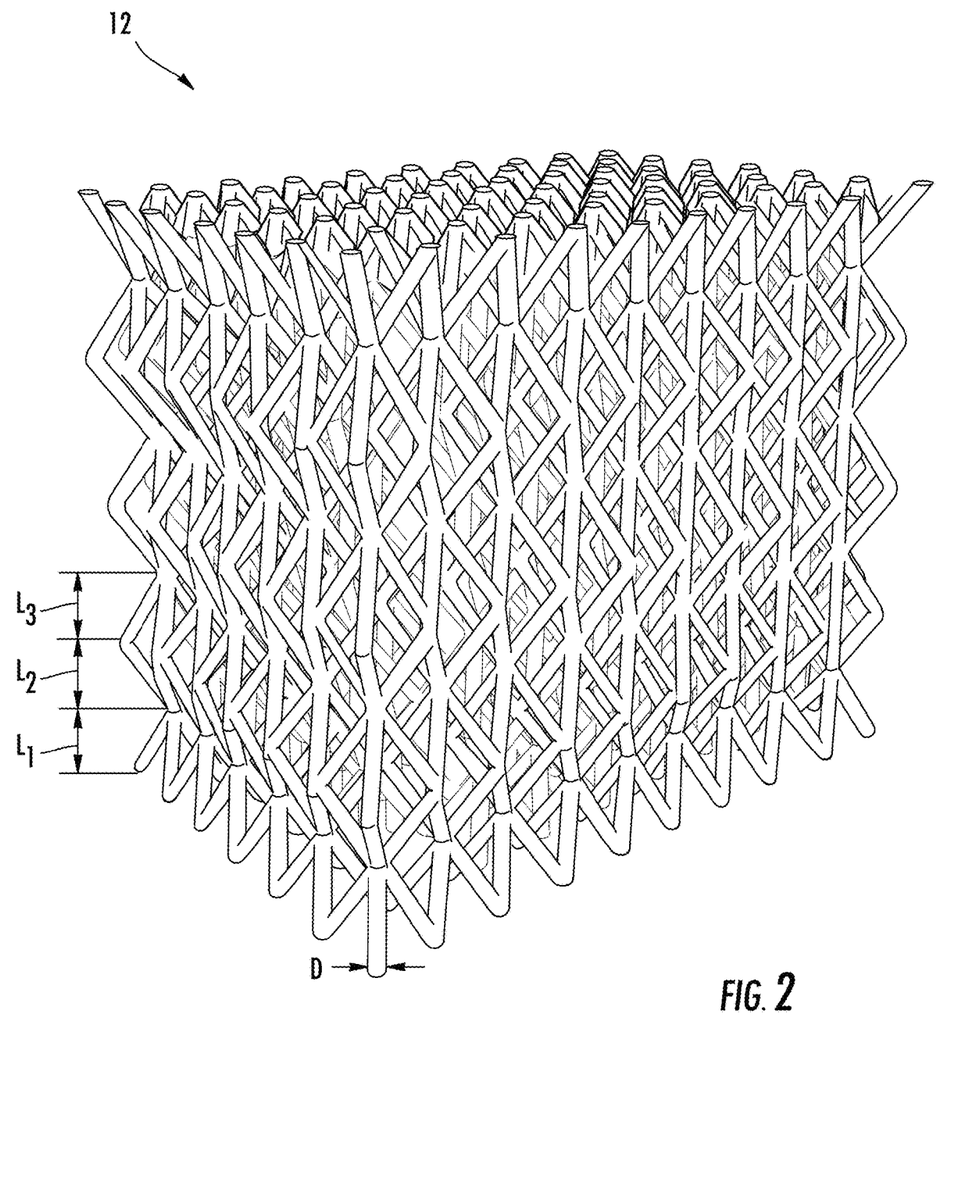
FIG. 2 is a perspective view of a microlattice structure according to certain embodiments of the present invention.

Conversely, decreasing the relative density of the microlattice structure 12 within the region 16 increases the breathability and flexibility of the microlattice structure 12 in that region 16. As shown in FIG. 2, the microlattice structure may include a diameter D for the microlattice elements. In some embodiments, the diameter D is approximately 0.5 mm to 6 mm. In certain embodiments, the diameter D is approximately 4 mm to 5 mm. In some embodiments, a microlattice structure 12 includes multiple levels of lattice structures. As shown in FIG. 2, as one example, a microlattice structure 12 may include eight levels where each level has a depth $L_1$, $L_2$, $L_3$, etc. The dimension for each level may be controlled by the angle of light L passing through mask 850 and the depth of the chamber (see FIG. 8). The microlattice structure 12 may have any number of levels. In some embodiments, the microlattice structure 12 has two levels (2 lattice levels high), and in certain embodiments, the microlattice structure 12 has eight to ten levels. For example, for a relatively thin material with many levels (high density), the depth of each level will be small, such as 1 mm or less. For a thicker material with fewer levels (low density), the depth of each level may be larger, such as 5-10 mm. In some examples, the depth ($L_1$, $L_2$, $L_3$, etc.) for each level may be equal; however, some microlattice structures 12 may include levels with varying depths. In one example, a microlattice structure 12 includes two levels where $L_1=L_2=5$ mm such that the total depth or thickness of the microlattice structure 12 is 10 mm. In another example, a microlattice structure 12 includes eight levels where $L_1=L_2=L_3=L_4=L_5=L_6=L_7=L_8=0.625$ mm such that the total depth or thickness of the microlattice structure 12 is 5 mm.

The desired properties of the microlattice structure 12 are often governed by the type of footwear component 10 into which it is being incorporated and the function that will be performed. As an example, the microlattice structure 12 may be used to promote ventilation and breathability in various parts of the footwear, such as the vamp 22, tongue 20, or other zones of the upper 18.

Method of Forming Uppers with a 3D Cured Shape

In some embodiments, as outlined in FIG. 3F, a method of forming uppers 18 made of microlattice structures 12 may comprise forming the upper 18 in a microlattice structure. The upper may be made from a plurality of pieces detailed in a pattern. The 2D pattern is then assembled to give the 3D shape. Similarly, a microlattice upper may be completed in flat (2D) orientation in less than one minute (approximately).

In some embodiments, during forming the upper 18, the lattice structure is removed from the bath while in its green state. The green state may be a state where the microlattice structure is a partially cured polymer lattice.

Once the upper 18 is partially cured in its green state, the upper 18 is draped over a last or mold 32 having the desired final shape of the upper 18. The upper 18 is then further cured an additional time to hold the shape of the last or mold 32. This additional curing typically requires approximately less than one minute under a light source. In some embodiments, the curing occurs in approximately 20 seconds under a UV light source. One example of a spherical or partially spherical mold 32 is shown in FIG. 3F.

This method reduces the need for extraneous packing materials. Presently, shoes need packing materials to maintain shape during transport and distribution, and to provide an aesthetic display for the customer. However, because a final shape of the upper may be defined using the mold and the shape/form of the UV curable footwear may be retained upon assembly, the footwear can be shipped without any extraneous packing or display materials.

Method of Forming Uppers Using Rolls of Microlattice Structures

Figure 12A:
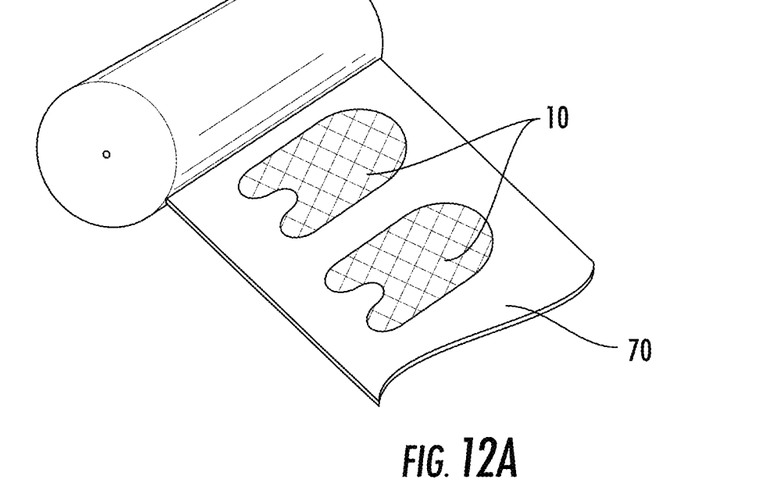
FIGS. 12A and 12B are perspective views of shoe manufacturing according to certain embodiments of the present invention.
Figure 12B:
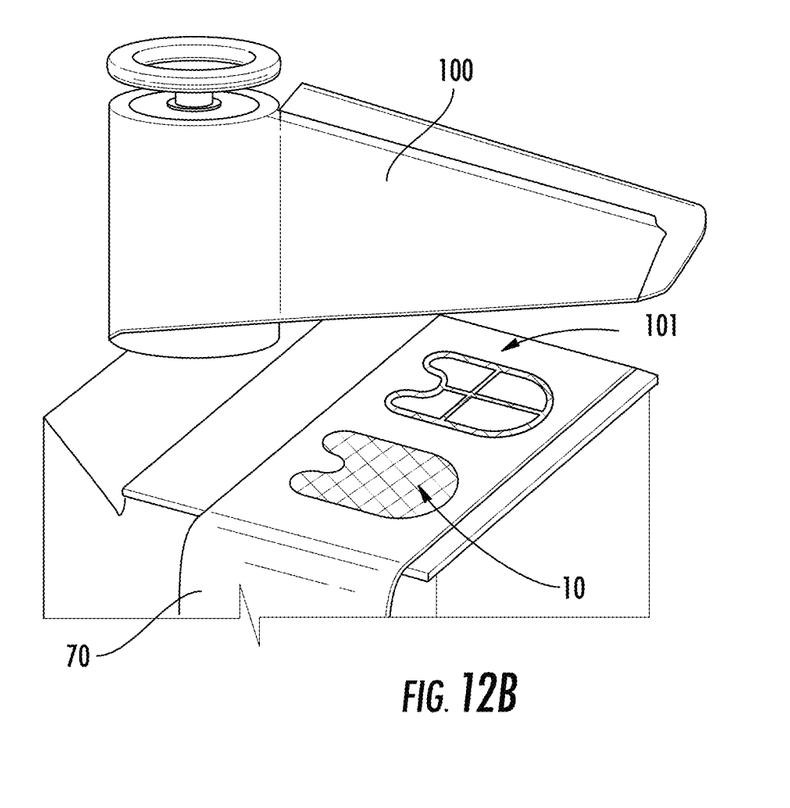

In some embodiments, as outlined in FIGS. 9A, 9B, 12A, and 12B, a method of forming uppers 18 made of microlattice structures 12 may comprise passing footwear components 10 on a belt from a first roll to a second roll. As shown in FIG. 12A, a roll may include a plurality of components 10 on sheet stock 70. As shown in FIG. 12B, the sheet stock from a first roll passes under the press 100 where a die 101 cuts out the component before the sheet stock 70 passes to the second roll.

In some embodiments, as outlined in FIGS. 9A, 9B, 12A, and 12B, a method of forming uppers 18 made of microlattice structures 12 may comprise forming repetitive upper patterns on rolls of microlattice structure stock material or sheet stock.

In these embodiments, an upper pattern is integrally grown in a continuous sheet, which may be rolled for ease of handling and transporting. The microlattice structures are created to the desired shape of the component (such as, for example, the upper or a portion thereof). The lattices are grown based on the orientation and arrangement of the apertures in the mask. If the apertures are aligned and placed to make a shoe pattern shape, the microlattice will form following that shape. A mask design may be used to create the repetitive upper patterns on the rolls of microlattice structure templates. The mask design includes apertures.

The next step involves curing the repetitive upper patterns. This partial curing step typically requires approximately less than one minute.

Various methods for removing the newly formed uppers from the rolls include, but are not limited to die-cutting, knife-excising, laser-cutting, water-jet cutting, and hand removal. Furthermore, the mask can include a feature where it outlines perforations around the upper pattern, allowing for easy removal of the newly formed upper from the roll.

In some embodiments, a layer 901 of microlattice structures 12 may include a single density such that specific portions of the upper 18 are cut from layer of material. As one example, FIG. 9A shows that the toe box 23 and the heel counter 26 are cut from the layer 901. These components may be attached to other portions of the upper 18, which, in some cases, are cut from other layers of material with different densities. As shown in FIG. 9B, in certain embodiments, the layer 902 includes multiple densities of microlattice structures 12 such that portions with varying densities of the upper 18 are cut from the layer 902.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of manufacturing an upper, the method comprising:
   pouring resin into a chamber;
   passing ultraviolet light through a mask into the resin along light paths defined by the mask to create a microlattice structure with a plurality of regions such that the plurality of regions comprise at least two different densities;

disassembling the microlattice structure in a partially cured state from the chamber; and post curing the microlattice structure into a final shape outside of the chamber.

2. The method of claim 1, further comprising mapping and designing various components of the upper and designing the mask based on the upper.

3. The method of claim 1, wherein the post curing comprises using a mold to define a permanent shape for the microlattice structure.

4. The method of claim 1, further comprising impregnating additives into a plurality of regions of the microlattice structure to create different colors or patterns.

5. The method of claim 1, further comprising attaching a second material to the microlattice structure.

6. The method of claim 5, wherein attaching the second material comprises forming a transition between the microlattice structure and the second material such that the microlattice structure and the second material are arranged end to end.

7. The method of claim 5, wherein the second material is selected from the group consisting of knits, woven fabric, non-woven fabric, leather, and synthetic leather.

8. The method of claim 5, wherein attaching the second material comprises (i) overlapping at least a portion of both a bottom surface of the microlattice structure and a bottom surface of the second material with a bottom layer and (ii) overlapping at least a portion of both a top surface of the microlattice structure and a top surface of the second material with a top layer.

9. The method of claim 8, further comprising (i) passing at least one first stitch through the top layer, the bottom layer, and the microlattice structure and (ii) passing at least one second stitch through the top layer, the bottom layer, and the second material.

10. The method of claim 1, wherein the plurality of regions comprises an eye stay region, a first region, and a second region, wherein the eye stay region comprises a high density microlattice structure, the first region comprises a mid-level density microlattice structure, and the second region comprises a low density microlattice structure.

11. A method of manufacturing an upper, the method comprising:

pouring resin into a chamber;

passing ultraviolet light through a mask into the resin along light paths defined by the mask to create a microlattice structure;

disassembling the microlattice structure in a partially cured state from the chamber; and post curing the microlattice structure into a final shape outside of the chamber.

12. The method of claim 11, wherein the post curing comprises using a mold to define a permanent shape for the microlattice structure.

13. The method of claim 11, further comprising attaching a second material to the microlattice structure.

14. The method of claim 13, wherein attaching the second material comprises (i) overlapping at least a portion of both a bottom surface of the microlattice structure and a bottom surface of the second material with a bottom layer and (ii) overlapping at least a portion of both a top surface of the microlattice structure and a top surface of the second material with a top layer.

15. The method of claim 14, further comprising (i) passing at least one first stitch through the top layer, the bottom layer, and the microlattice structure and (ii) passing at least one second stitch through the top layer, the bottom layer, and the second material.

16. The method of claim 11, wherein the microlattice structure comprises an eye stay region, a first region, and a second region, wherein the eye stay region comprises a high density microlattice structure, the first region comprises a mid-level density microlattice structure, and the second region comprises a low density microlattice structure.

17. A method of manufacturing an upper, the method comprising:

passing ultraviolet light into resin within a chamber along light paths to create a microlattice structure;

disassembling the microlattice structure in a partially cured state from the chamber; and post curing the microlattice structure into a final shape outside of the chamber, wherein:

the microlattice structure comprises an array of beams arranged three-dimensionally; and each intersection of at least two beams comprises a node, wherein each node is larger than a diameter of the beams.

18. The method of claim 17, wherein the post curing comprises using a mold to define a permanent shape for the microlattice structure.

19. The method of claim 17, wherein the microlattice structure comprises a plurality of regions such that the plurality of regions comprise at least two different densities.

20. The method of claim 17, further comprising (i) overlapping at least a portion of both a bottom surface of the microlattice structure and a bottom surface of a second material with a bottom layer and (ii) overlapping at least a portion of both a top surface of the microlattice structure and a top surface of the second material with a top layer.

* * * * *